United States Patent [19]
Saunders

[11] 3,739,381
[45] June 12, 1973

[54] PULSE RADAR AND ALTIMETER SYSTEM WITH IMPROVED CLOSE-IN RESPONSE

[76] Inventor: William K. Saunders, 8505 Seven Lock Road, Bethesda, Md. 20034

[22] Filed: Jan. 28, 1972

[21] Appl. No.: 221,716

[52] U.S. Cl. .............................................. 343/13 R
[51] Int. Cl. .............................................. G01s 9/06
[58] Field of Search ........................ 343/13 R, 7 TA

[56] References Cited
UNITED STATES PATENTS
| | | | |
|---|---|---|---|
| 2,438,836 | 3/1948 | Wolff | 343/13 R |
| 2,789,284 | 4/1957 | Silhavy | 343/13 R X |
| 3,122,720 | 2/1964 | Morse | 343/13 R X |

*Primary Examiner*—Malcolm F. Hubler
*Attorney*—Harry M. Saragovitz

[57] ABSTRACT

A pulse radar or pulse altimeter system which substantially eliminates the adverse effects of the portion of the transmitted pulses which leak directly into the receiver of the system without first being reflected from a surface, the location of which is to be detected. A wideband amplification and limiting means is provided at the front end of the receiver. The bandwidth of the amplification and limiting means is at least 5 times $1/\tau$ where $\tau$ is the duration of the pulses emitted by the transmitter to ensure that the leakage pulses are rapidly cleared out of the receiver circuitry so as not to obscure signals reflected from close-in surfaces. The amplification and limiting means linearly amplifies pulse signals reflected form desired surfaces but limits the much greater leakage pulse signal so that both leakage and signal pulses are presented to the receiver processing circuitry at the same order of magnitude.

11 Claims, 5 Drawing Figures

Patented June 12, 1973  3,739,381
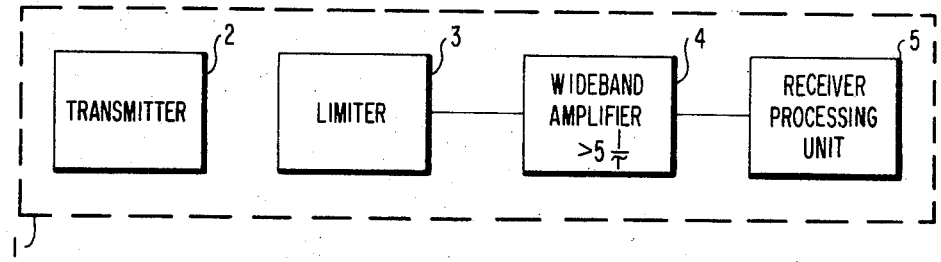
FIG. 1
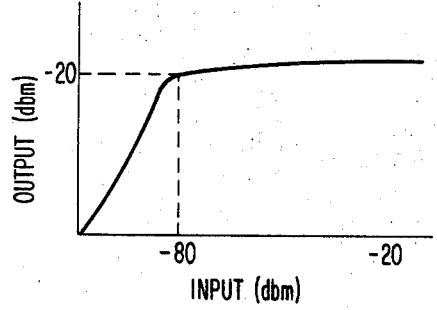
FIG. 2
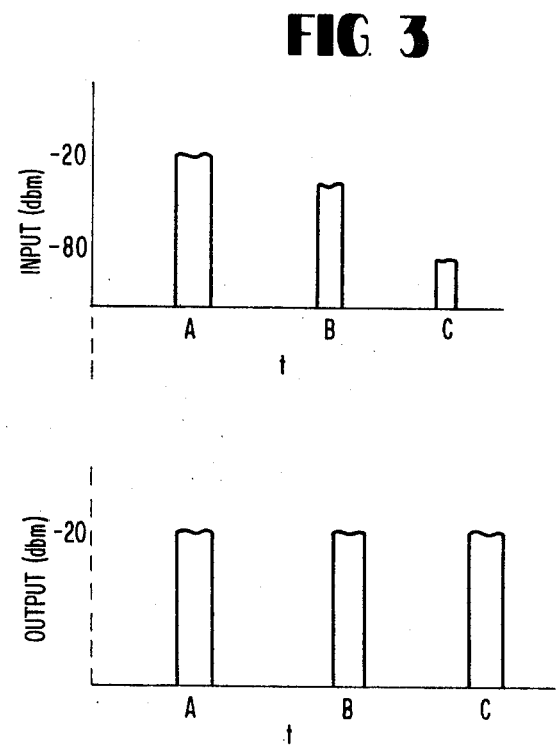
FIG. 3
FIG. 4
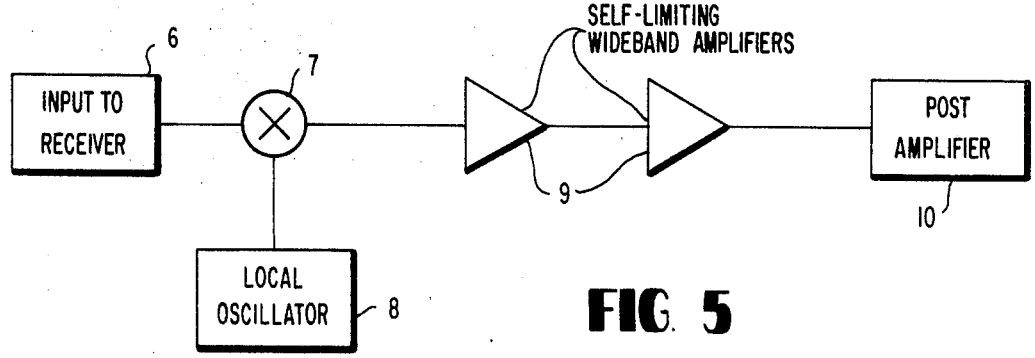
FIG. 5

PULSE RADAR AND ALTIMETER SYSTEM WITH IMPROVED CLOSE-IN RESPONSE

The invention described herein may be manufactured, used and licensed by or for the United States Government for governmental purposes without the payment to me of any royalty thereon.

This invention relates to pulse radar or pulse altimeter systems in which the energy which leaks from the transmitter of the system to the receiver of the system each time a pulse is transmitted into space is prevented from adversely affecting the performance of the receiver.

A pulse radar system consists of a transmitter which transmits pulses into space and a receiver in close proximity to the transmitter which receives these pulses after they have been reflected by objects in space and which determines the location of the objects. A pulse altimeter system is similar to a pulse radar system except that it is the location of the surface of the earth which is detected. One of the problems associated with the operation of such a radar system is the adverse effects of pulse energy which "leaks" from the transmitter directly to the receiver without first being reflected from the target surface.

When a pulse radar or pulse altimeter system is operated, a high level signal is radiated by the transmitter. Part of this high level signal is directly incident on the receiver and saturates the receiver circuitry, thereby limiting the response of the receiver to signals which are reflected from nearby surfaces. This problem becomes extremely significant in a "flare-out" altimeter which is designed to detect altitude at low heights and right down to touchdown. The so-called "main bang" leakage energy frequently represents a sizeable portion of the transmitted energy and is usually substantially larger than the energy which will be reflected to the radar or pulse altimeter by the target or ground.

In high power radar systems, it is customary to close the receiver down during transmission as completely as possible to prevent physical damage. This is normally accomplished with self-triggering or triggered ionizing devices. With altimeters and low power radar systems, however, various alternatives, such as dual isolated antennas, ferrite circulators, and solid state radio frequency limiters have been used. None of these alternatives, however, have been successful in preventing the leakage signal from interfering with the signals reflected from surfaces to be detected.

It is therefore an object of the invention to provide a radar system or pulse altimeter system with improved close-in response characteristics.

It is a further object of this invention to provide a low power radar system or pulse altimeter system wherein the adverse effects of main bang leakage energy are substantially eliminated.

It is still a further object of the invention to provide a system which may be used in conjunction with a flare-out altimeter to provide improved response at low heights.

The above objects are accomplished by providing a wide band amplification and limiting means at the front end of the receiver. The bandwidth of the amplification means is at least 5 times the usual $1/\tau$ bandwidth where $\tau$ is the duration of the pulses emitted by the transmitter. The wide bandwidth ensures that the leakage pulse is cleared out of the amplifier as rapidly as possible so that the pulses reflected from nearby targets are not obscured.

The amplification and limiting means is arranged to linearly amplify pulses reflected from desired objects but to limit pulses of the magnitude of the leakage pulse so that both types of pulses exit from the amplification and limiting means at the same order of magnitude instead of at vastly different magnitudes. The relatively narrowband portions of the receiver processing circuitry are able to sort the desired signal from the leakage signal when they are at the same order of magnitude whereas this would not be possible where the signals are of greatly different magnitudes. There is no significant signal to noise penalty for the wideband amplifier as the post amplifier can establish the optimum bandwidth for the pulse width transmitted.

Other objectives and a full understanding of the invention may be had by referring to the following description of the preferred embodiment of the invention, taken in conjunction with the accompanying drawings in which:

FIG. 1 shows a pulse radar or pulse altimeter system according to the invention in block diagram form.

FIG. 2 shows the input/output characteristic of the amplification and limiting means of the invention.

FIGS. 3 and 4 show pulses at the input of the amplification and limiting means and the corresponding pulses at the output thereof, respectively.

FIG. 5 shows an embodiment of the invention using a superheterodyne type receiver.

FIG. 1 shows a pulse radar system or pulse altimeter system according to the invention. This system may be located at a stationary site or in the alternative may be mounted upon a moving vehicle such as an aircraft. Transmitter 2 is a standard low power radar transmitter and transmits pulses of short duration into space. In the preferred embodiment of the invention, the pulses are of 0.1 microsecond duration. These pulses after being reflected from a distant surface are received at receiver processing unit 5 which extracts information from the pulses to determine the location of the surface from which the pulses have been reflected. Receiver processing unit 5 is a standard low power radar receiving unit which is well known in the art.

In the absence of limiter 3 and wideband amplifier 4 each time a pulse is transmitted into space by transmitter 2 a significant portion of the pulse energy would "leak" into the receiver and drive the receiver circuitry into saturation, thereby limiting the response of the receiver to signals which are reflected from nearby objects. Additionally, in the absence of limiter 3 and wideband amplifier 4, relatively large leakage pulses would be amplified in the same fashion that small signals reflected from distant surfaces are amplified in the amplification stages of the receiver and these signals would be presented to the processing circuitry which extracts information from the pulses at vastly differing levels. The processing circuitry which is inherently narrowband would be unable to extract the desired information from signals of greatly differing magnitude.

The addition of limiter 3 and wideband amplifier 4 however obviates these problems. The bandwidth of the amplifier/limiter combination is arranged to be at least 5 times the usual $1/\tau$ bandwidth, where $\tau$ is the duration of the pulses emitted by the transmitter. Thus for the 0.1 microsecond pulse used in the preferred embodiment the usual bandwidth allowed would be 10 megacycles. According to the invention, however, a bandwidth of from 50 to 1,000 megacycles would be employed. This increased bandwidth ensures that signals are cleared out of the circuitry as quickly as possible and prevents the leakage pulse from interfering with signals reflected from close-in surfaces. The amplifier/limiter combination is particularly useful when used in combination with a flare-out altimeter which is used to detect low heights right down to touchdown.

The input/output characteristic of the amplifier/limiter combination is shown in FIG. 2. It is seen that the characteristic curve has an approximately linear portion and a saturated portion. The largest small signal received from a distant surface desired to be detected by the radar or altimeter may be about −80 dbm. and for reflected pulses of −80 dbm., or below, the output of the amplifier/limiter is approximately linear. For instance, if the amplifier has 60 decibels of gain, the output for an input pulse of −80 dbm. would be −20 dbm.

The leakage portion of the transmitted pulse however is significantly greater than −80 dbm. and may be about −20 dbm. The leakage signal will thus be limited by the amplifier/limiter combination to also about −20 dbm. Hence, it is seen that both signals reflected from distant objects and the leakage signal are presented at the output of the amplifier/limiter to the receiver processing circuitry at the same order of magnitude. While the pulses will not always be at exactly the same magnitude, the fact that they are at the same order of magnitude instead of at greatly differing magnitudes will enable the receiver processing circuitry to extract information from them.

In FIGS. 3 and 4 pulses A, B and C represent a leakage pulse, a pulse reflected from a very large nearby object, and a pulse reflected from a distant object respectively. FIG. 3 shows the pulses at the input to the amplifier/limiter combination and FIG. 4 shows the pulses at the output of the combination. It is seen that the leakage pulse is limited while the pulse reflected from the very large nearby object and the pulse reflected from the distant object are amplified. All three pulses are therefore presented to the receiver processing circuitry at about the same level for information extraction.

The amplification and limiting means of the invention is illustrated in FIG. 1 as comprising a separate limiter and wideband amplifier. The limiter is a standard component and its construction is well known in the art. For instance, the limiter of the invention may be a standard diode or triode clipper. While the wideband amplifier is illustrated in FIG. 1 as being connected to the output of the limiter, in the alternative the limiter may be connected to the output of the wideband amplifier. Also the amplification and limiting means may be an integrally contained self-limiting amplifier. Modern wideband transistor integrated-chip amplifiers, for example, are normally self-limiting at levels of about −20 dbm. and may be used as the amplification and limiting means of the invention.

FIG. 5 illustrates the invention as it may be utilized in a superheterodyne type receiver. Mixer 7 has one input connected to the receiver input 6 and the other input connected to local oscillator 8 and produces a signal of an intermediate frequency which is fed to self-limiting wideband amplifiers 9, from where it is fed to conventional post amplifiers 10. Here it is noted the amplification and limiting means is located after the radio frequency signal has been reduced to a suitable intermediate frequency by the miser of the receiver. The wideband amplifier thus has a bandwidth about the intermediate frequency of the receiver. The mixer itself because it is inherently wideband and tends to limit the intermediate frequency signal at some 10 db below the smallest of the two signals it receives, may be used as the first limiting means. For example, if the local oscillator is set at the customary milliwatt, the largest intermediate frequency signal that can be produced is about 0.1 milliwatts (−10 dbm.), regardless of the size of the leakage signal. This effect can be enhanced by reducing the local oscillator signal to be a fraction of a milliwatt.

It should be understood that the invention is not limited to the exact details of construction shown and described herein for obvious modifications will occur to persons skilled in the art.

I claim:

1. A pulse radar or pulse altimeter system comprising a radio transmitter means for transmitting radio pulses and a radio receiver means located in close proximity to said transmitter means for receiving said pulses after reflection from a target surface, a leakage portion of each of said transmitted radio pulses being directly incident on said receiver means without first being reflected from said target surface, said receiver means including means for amplifying said reflected pulses and for limiting said leakage portion of said transmitted pulses, said means for amplifying and limiting having a bandwidth substantially greater than the reciprocal of the duration of said transmitted pulses for rapidly clearing said leakage portion of said transmitted pulses from said receiver means so that received pulses reflected from nearby surfaces are not obscured.

2. The system of claim 1 wherein said means for amplifying and limiting amplifies said reflected pulses and limits said leakage portion of said transmitted pulses so that at the output of said means said reflected and limited pulses are of the same order of magnitude, said receiver means further including receiver pulse processing means responsive to pulses of the same order of magnitude for extracting information from said pulses at the output of said means.

3. The system of claim 2 wherein said bandwidth is at least five times the reciprocal of the duration of said transmitted pulses.

4. The system of claim 3 wherein said amplification and limiting means is located at the front end of said receiver means.

5. The system of claim 4 wherein said amplification and limiting means comprises a limiter means followed by a wideband amplifier means.

6. The system of claim 4 wherein said amplification and limiting means comprises a wideband amplifier means followed by a limiter means.

7. The system of claim 3 wherein said amplification and limiting means comprises a self-limiting wideband amplifier means.

8. The system of claim 7 wherein self-limiting wideband amplifier means is a transistor integrated-chip amplifier.

9. The system of claim 3 wherein said receiver means is a superheterodyne type receiver means including a mixer means and wherein said means for amplifying and limiting is connected after the output of said mixer means.

10. The system of claim 9 wherein said mixer means has a bandwidth substantially greater than the reciprocal of the duration of said transmitted pulses and wherein said mixer means is self-limiting.

11. The system of claim 1 wherein said pulse altimeter system comprises a flare-out altimeter system.

\* \* \* \* \*